United States Patent

Slavin

[15] 3,659,052

[45] Apr. 25, 1972

[54] MULTIPLEX TERMINAL WITH REDUNDANCY REDUCTION

[72] Inventor: Martin J. Slavin, Huntington, N.Y.

[73] Assignee: Phonplex Corporation, New York, N.Y.

[22] Filed: May 21, 1970

[21] Appl. No.: 39,405

[52] U.S. Cl. ....................................... 179/15 BW, 179/15.55

[51] Int. Cl. ........................................................... H04j 3/18

[58] Field of Search ......................... 179/1 SA, 15.55, 15 BW

[56] References Cited

UNITED STATES PATENTS

| | | | |
|---|---|---|---|
| 2,860,187 | 11/1958 | David | 179/15.55 R |
| 3,521,235 | 7/1970 | Becker | 179/1 SA |
| 3,466,394 | 9/1969 | French | 179/1 SA |
| 3,238,298 | 3/1966 | Willis | 179/15.55 |
| 3,502,806 | 3/1970 | Townsend | 179/15 BW |
| 3,378,641 | 4/1968 | Varsos et al. | 179/15.55 |
| 3,236,947 | 2/1966 | Clapper | 179/1 SA |
| 3,278,685 | 10/1966 | Harper | 179/1 SA |
| 3,369,182 | 2/1968 | Reindl | 179/15.55 |

OTHER PUBLICATIONS

Proceedings of the IEEE, Vol. 55, No. 3, March 1967; " Redundancy Reduction–A Practical Method of Data Compression" pp. 253–263.

*Primary Examiner*—Kathleen H. Claffy
*Assistant Examiner*—David L. Stewart
*Attorney*—Blum, Moscovitz, Friedman & Kaplan

[57] ABSTRACT

A terminal system for interconnecting a plurality of user channels and a transmission channel of limited bandwidth for transmission of telephone voice signals and the like including an input processor for detecting redundancies in the pattern of each transmitted user signal received from the respective user channels and for applying a transmission signal to said transmission channel including at least a non-redundant portion of each redundant pattern of each of said transmitted user signals and a direction code adapted to communicate the number of repetitions of each such non-redundant portions necessary to reproduce said redundant patterns. The terminal may include output processor means for receiving from the transmission channel a transmission signal including non-redundant received user signal portions and direction codes associated with each of said user channels. The output processor reconstructs the received user signal associated with each user channel by incorporating the associated non-redundant received user signal portion repeated as directed by the associated direction codes for application to the user channel associated therewith.

17 Claims, 8 Drawing Figures

INVENTOR.
MARTIN J. SLAVIN
BY
Blum, Moscovitz, Friedman & Kaplan
ATTORNEYS

INVENTOR.
MARTIN J. SLAVIN
BY
Blum, Moscowitz, Friedman & Kaplan
ATTORNEYS

INVENTOR.
MARTIN J. SLAVIN

BY

Blum, Moscovitz, Friedman & Kaplan
ATTORNEYS

INVENTOR.
MARTIN J. SLAVIN
BY
Blum, Moscovitz, Friedman & Kaplan
ATTORNEYS

MULTIPLEX TERMINAL WITH REDUNDANCY REDUCTION

BACKGROUND OF THE INVENTION

This invention relates generally to systems for providing transmission of telephone voice signals and the like. Conventional transmission signals are restricted by the bandwidth of the transmission channel as to the number of voice signals which can be carried thereby. Thus, a conventional telephone line having a 4 kilohertz bandwidth can transmit only a single conventional telephone conversation, since the transmission of such a telephone conversation requires the full 4 kilohertz bandwidth. Attempts at utilizing conventional multiplexing techniques based on sequential sampling of each of the channels of information to be transmitted over the transmission channel proved unsuccessful due to the increased bandwidth required if full fidelity of transmission is to be achieved.

By providing a terminal system which compresses the voice signal on each of a plurality of user channels before transmission over a transmission channel, simultaneous multiple use of single channels of limited bandwidth can be achieved.

SUMMARY OF THE INVENTION

Generally speaking, in accordance with the invention, a terminal system for interconnecting a plurality of user channels and a transmission channel of limited bandwidth for transmission of telephone voice signals and the like is provided including input processor means connected to said user channels for receiving the transmitted user signals on each of said user channels, detecting redundancies in the pattern of each said transmitted user signal, and applying a transmission signal to said transmission channel including at least a non-redundant portion of each redundant pattern of each of said transmitted user signals and a direction code adapted to communicate the number of repetitions of each such non-redundant signal portions necessary to reproduce said redundant patterns. The terminal system may also include output processor means for receipt from the telephone transmission channel of a transmission signal including non-redundant received user signal portions and direction codes associated with each of said user channels. Said output processor means is adapted to reconstruct the received user signal associated with each user channel by incorporating the associated non-redundant received user signal portion repeated as directed by direction codes for application to the user channel associated therewith.

The terminal system may include encoder means for sampling the analog transmitted user signal on each of the user channels to produce a series of analog sample signals and for producing a digital sample signal representative of each of said analog sample signals. In such an embodiment the input processor means would be adapted to detect redundancies in the pattern of digital sample signals associated with each telephone user channel while the output processor means would be adapted to reconstruct the received user signal associated with each telephone user channel as a sequential series of digital sample signals. Further, in such an embodiment, decoder means would be provided for producing an analog sample signal representative of each of the digital sample signals received from the output processor means and for sequentially applying the respective analog sample signals thus produced to the user channel associated therewith.

In another embodiment of the arrangement according to the invention, said encoder means may be adapted to detect points on the analog transmitted user signal received from each of said telephone user channels at which the slope of the curve defining said analog signal substantially equals zero and for producing a zero-slope sample signal associated with at least some of said points, said zero-slope sample signal including a portion representative of the magnitude of said signal at said point and a portion representative of the time position of said point. In such an embodiment, the input processor means would be adapted to detect redundancies in the pattern of said zero-slope sample signals associated with each user channel while the output processor would be adapted to reconstruct the received user signal associated with each telephone user channel as a series of zero-slope signals. Further, such an embodiment would include decoder means for producing the analog received user signal representative of the series of zero-slope signals associated with each user channel and applying the respective analog received signals thus produced to the user channels associated therewith.

The transmission signal produced by the input processor means may be divided into a plurality of time slots sequentially assigned to each of said user channels for the transmission therein of the associated non-redundant portions of each redundant pattern and direction code. Said transmission signal may also be divided into a plurality of time slots randomly assigned to non-redundant user signal portions. In such an embodiment, address data identifying the user channel to which each non-redundant signal portion is directed accompanies each such portion. The direction code may include such address data and the time position of such address data in the transmitted signal, in which case, the output processor means repeats the non-redundant signal portion associated with each user channel until the next non-redundant signal portion associated with that channel is received. The input and output processor means may include memory means for storing portions of each transmitted user signal including non-redundant portions thereof during the identification of redundancies for selection of the direction codes and for storing non-redundant portions of the received user signal during the repetition thereof as directed by direction codes.

The terminal system may include dial and ringing circuit means connected to the plurality of user channels for applying ringing signals thereto and receiving dial signals therefrom for user channel activation. The input processor means would be connected to the dial and ringing circuit means for detecting dial signals therefrom and applying same to the transmission channel while the output processor means would be connected to said dial and ringing circuit means for applying thereto ringing signals received from said transmission channel.

The input processor means may include pattern search means for comparing the signal portions defining each of a group of adjacent pairs of each transmitted user signal, the signal portions in each pair being of substantially equal duration, each of said pairs in said group starting at a single reference point in said transmitted user signal. The pattern search means is adapted to identify a pair of said group as a redundant pattern in a transmitted user signal. The pattern search means may further compare one of the pair of adjacent portions defining a redundant pattern of a transmitted user signal with the next adjacent portion of said transmitted user signal, said next adjacent portion of said transmitted signal being substantially equal in duration with the portions defining the redundant pattern pair, and determine if said redundant pattern pair and the next adjacent portion constitute a redundant pattern of said transmitted user signal. The pattern search means may identify a pair of said group as a redundant pattern by comparing a plurality of corresponding predetermined points on each of said pair of transmitted user signal portions and determining if said points correspond within a predetermined tolerance.

Accordingly, it is an object of this invention to provide a terminal system which permits the simultaneous multiple use of a single channel of limited bandwidth.

Another object of the invention is to provide a terminal system particularly adapted to telephone application permitting the use of a single transmission channel to transmit the signal to and from a plurality of user lines.

A further object of the invention is to provide a terminal system wherein redundancies in voice signals or the like are reduced to produce a compressed signal for transmission which can be reconstructed upon receipt without loss of meaningful signal content.

A further object of this invention is to produce a terminal system wherein the signal on a plurality of channels is compressed and portions of the compressed signal are transmitted in assigned time slots over a transmission line to a second terminal whereat said signals are reconstructed.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which.

DESCRIPTION OF THE PREFERRED EMBODIMENTS

Figure 1:
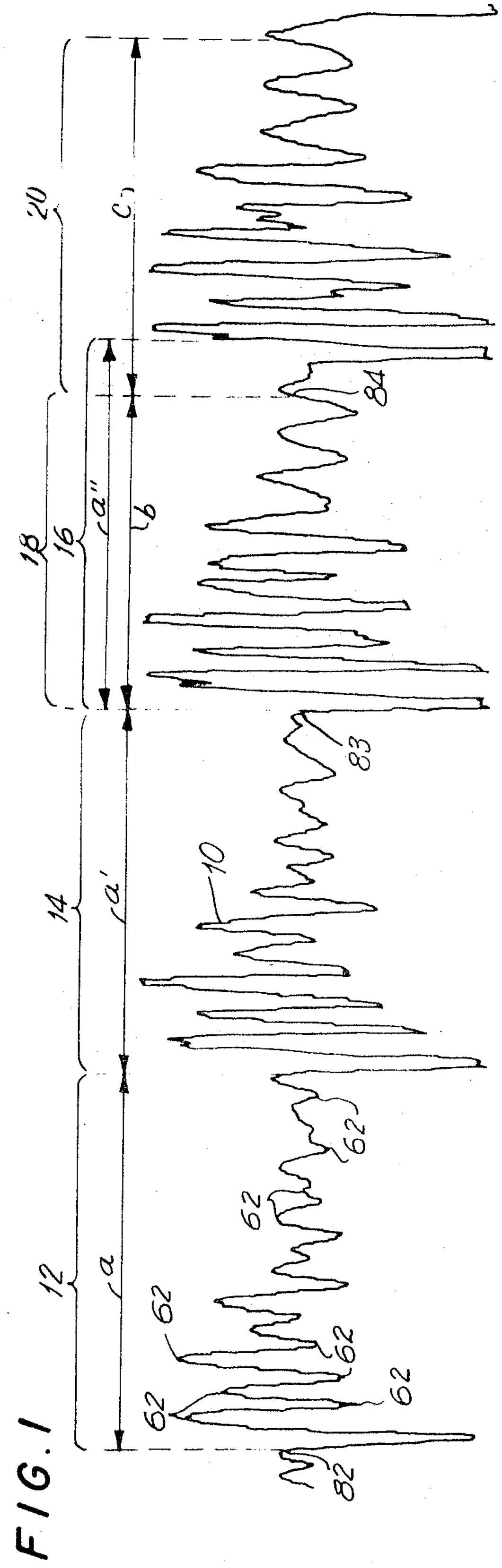
FIG. 1 is a wave form diagram of a typical voice signal.

Referring now to FIG. 1, the waveform 10 shown therein is of a digitized segment of an analog signal produced by human speech. The sampling rate of the digitized signal was sufficiently large to insure an accurate representation of the analog signal while providing said signal in a usable form for operation. The arrangement according to the invention as described below is particularly adapted to take advantage of certain characteristics of speech. It has been found that human speech contains a redundant repetition of substantially identical patterns. Thus, the portion of waveform 10 within bracket 12 and the portion of said waveform within bracket 14, while containing some differences, have been found to be sufficiently close so that the pattern within bracket 12 may be substituted for the pattern within bracket 14 without substantial degradation of comprehension of the sounds represented by said waveform portions. Thus, applicant has found that, in order to transmit the signal incorporated within brackets 12 and 14, it is sufficient to merely transmit the signal contained within bracket 12 and an instruction that said signal portion be repeated twice. The latter instruction, which can take a number of forms to be described below, and is hereinafter referred to as a direction code, occupies a substantially smaller time slot than the time slot occupied by the portion of signal 10 included within bracket 14, so that a substantial compression of the signal necessary for transmission of waveform 10 is achieved. The redundancies in speech signals are required, among other reasons, to allow time for mental pattern recognition by a human listener and have been found to be prevalent in human speech. Thus, two, three, and more, of what are substantially repetitions of a single pattern are commonplace in speech sound. Such repetitive patterns in speech and other signals are herein referred to as redundant patterns. By transmitting only a single repetition of a non-redundant portion of a redundant pattern and a direction code, it has found that substantial compression of a transmitted speech signal or the like can be achieved and that said compressed signal is readily reconstructed to reproduce the original speech signal without material degradation thereof.

The extent of the degradation of the reconstructed signal, as compared with the original signal, depends on the criteria selected for determining whether successive signal portions are, in fact, redundant. By careful selection of the tolerance within which differences between the two signal portions under consideration must lie, substantial degradation can be avoided.

In the case of the waveform 10 of FIG. 1, the portion thereof within bracket 12, which was of a duration a was found, within preselected tolerance, to be "identical" with the portion included within bracket 14, which is of a duration $a'$. Duration $a$ and duration $a'$ are substantially equal, the differences therebetween falling within acceptable tolerances for voice reproduction. However, when the portion within bracket 12 is compared with the portion of waveform 10 within bracket 16, said latter portion being of a duration $a''$, the differences between the two portions exceeded the predetermined tolerances for proper voice reproduction. Accordingly, the portions within bracket 12 and 14 were deemed to be redundant while the next portion was not. In fact, it was found that the portion within bracket 18, having a length $b$, represented a non-redundant portion while the portion of waveform 10 within bracket 20, of a duration $c$, proved to be substantially identical with the next portion of the waveform (not shown).

A similar analysis of the waveform of an entire speech message reveals many redundant patterns permitting substantial compression of that message for the purposes of transmission.

Figure 2:
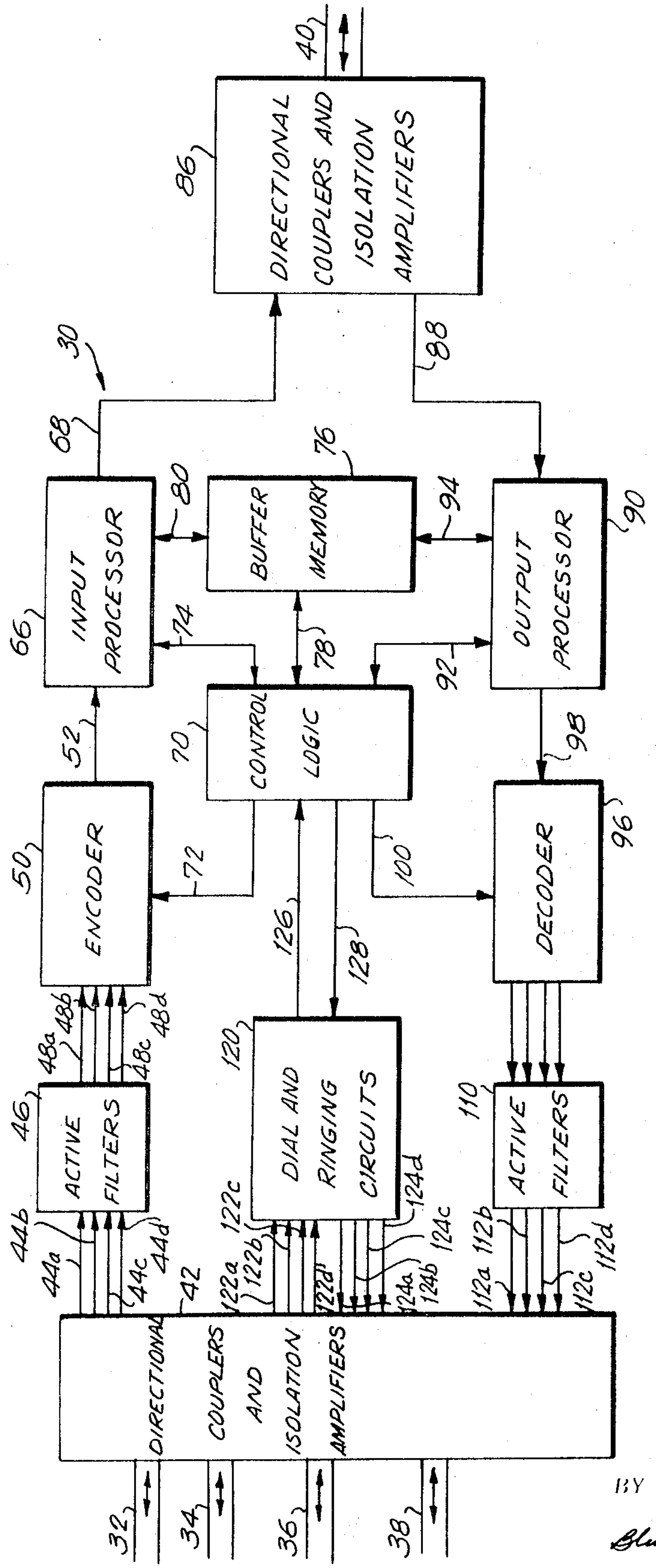
FIG. 2 is a block diagram of the terminal system according to the invention.

Turning now to FIG. 2, the terminal system 30 pictured therein is adapted to utilize the foregoing signal compression principles for interconnecting a plurality of user channels such as the four user channels 32, 34, 36 and 38 and a transmission channel 40 of limited bandwidth for the simultaneous transmission of telephone voice signals and the like on the user channels along said transmission channel. Channels 32, 34, 36, 38 and 40 may take any form such as hard wired line or radio or other transmission media. The terminal system according to the invention is necessitated by the fact that, under normal circumstances, transmission channel 40 does not have sufficient bandwidth to simultaneously transmit the signal on the four user channels.

Terminal system 30 is coupled to user lines 32, 34, 36 and 38 through directional couplers and isolation amplifiers 42. Said directional couplers and isolation amplifiers are of conventional design providing two way selective coupling for the receipt from each user channel of the transmitted user signal thereon for processing and transmission and for application to each user channel of received user signals from transmission channel 40.

Figure 3:
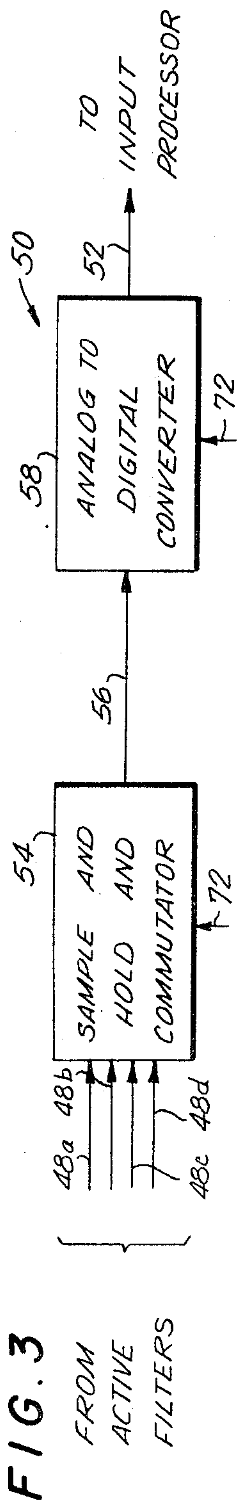
FIGS. 3 and 5 are block diagrams of two embodiments of the encoder of the terminal system according to FIG. 2.

The transmitted user signal received from user lines 32, 34, 36 and 38 are applied respectively along lines 44*a*, *b*, *c* and *d* to activate filters 46 which filter out and transmit only the analog received user signal on each user channel, eliminating noise and other spurious signals thereon. The analog received user signals are transmitted along corresponding lines 48*a*, *b*, *c* and *d* to encoder 50. The encoder is adapted to convert the analog received user signals into a digital form which would allow computer data processing techniques to search and sort each of said signals for pattern recognition. Further, encoder 50 is adapted, using conventional multiplexing techniques to sample each of the user channels and to produce a single intermediate signal consisting of a sequential series of portions of each of said received user signals. This intermediate signal, applied along line 52, would have a bandwidth too large to permit transmission along transmission line 40 since it does not involve sufficient compression. One embodiment of the encoder according to the invention is shown in FIG. 3 wherein a conventional sample and hold and commutator circuit 54 sequentially samples the transmitted user signals on lines 48*a*, *b* *c* and *d* respectively and sequentially applies said sample signals along line 56 to analog to digital converter 58 which converts each sample signal into a coded digital signal suitable for computer operation. Thus, the signal transmitted along line 52 consists of a series of digital sample signals each in an assigned time slot. If the first of such time slots were assigned to the signal on line 48*a* corresponding to the transmitted user signal on channel 32, the next time slot would contain a digital sample of the transmitted user signal on line 48*b* corresponding to channel 34, the next time slot would contain a digital sample of the signal on line 48*c* corresponding to the signal from channel 36, the fourth time slot would contain a digital sample of the signal on line 48*d* corresponding to channel 38, while the fifth time slot would contain a second sample of the signal on line 48*a* corresponding to channel 32.

Figure 5:
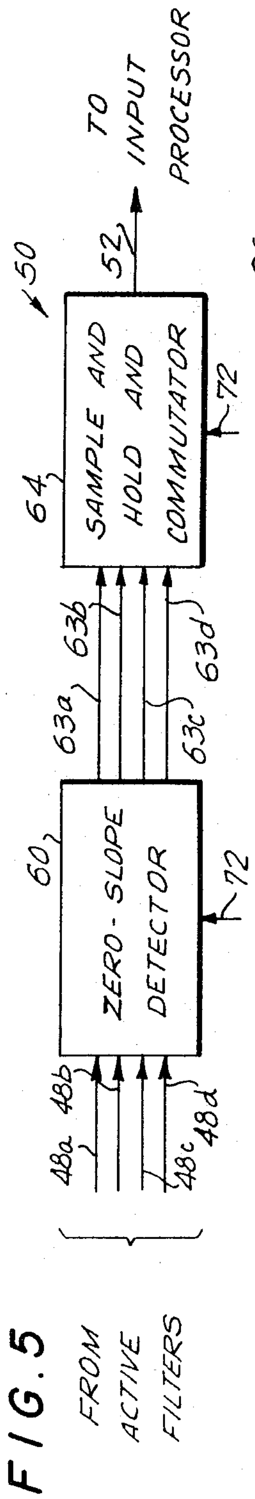

Still another embodiment of the encoder 50 according to the invention is shown in FIG. 5 wherein the signals from lines 48*a*, *b*, *c* and *d* are applied to zero-slope detector 60 for detecting points on the analog transmitted user signals thereon at which the slope of the curve defining said analog signals substantially equals zero and producing a zero-slope sample signal associated with at least some of said points. Referring to FIG. 1, it is seen that one principal characteristic of the voice signal are the maxima and minima points thereof at which the slope of the curve defining said signal equals zero. A number of such points are indicated by reference numerals 62 on FIG. 1. It has been found that the normal voice transmitted signal may be adequately represented by a series of zero-slope sample signals representative of each of said points 62 of zero-slope. Each of said zero-slope points may be accurately represented by a signal identifying the magnitude of the signal at that point and its location. Thus, the zero-slope signal produced by zero-slope detector 60 would consist of a series of digital signals representative of the various zero-slope points, each digital signal including a portion representative of the magnitude of the signal at said point and a portion representative of the time position of said point. The zero-slope signal associated with each received user signal is applied respectively along lines 63*a*, *b*, *c* and *d* to a sample and hold and commutator circuit 64 which sequentially applies the digital zero-slope sample signals associated with each user channel onto a single line 52 as an intermediate signal. As in the case of the embodiment of FIG. 3, each zero-slope sample signal is sequentially assigned to a time slot in said intermediate signal.

Referring again to FIG. 2 the intermediate signal containing coded representations of the transmitted user signals from channels 32, 34, 36 and 38 in assigned time slots is applied to input processor 66. Said input processor is adapted to detect redundancies in the pattern of each of said transmitted user signals present in the assigned time slots of said intermediate signal and to produce a transmission signal including at least a non-redundant portion of each redundant pattern of each of said transmitted user signals and a redundancy code representative of the number of repetitions of each such non-redundant portions necessary to reproduce said redundant patterns, said transmission signal being applied to line 68. Control logic 70 is incorporated in terminal system 30 to govern the sequential operation thereof and to control the timing of the various components. Said control logic is coupled along line 72 to encoder 50 and along line 74 to input processor 66. Control logic 70 also governs the operation of buffer memory 76 which is joined thereto by line 78. Said buffer memory is coupled to input processor 66 by line 80 and provides the storage capability necessary for input processor 66 to perform its pattern search function.

Input processor 66 preferably takes the form of a data processing device such as a computer capable of performing the rapid search, comparison and sort functions required for pattern recognition. The pattern search function performed by input processor 66 consists of looking for two or more cycles of a repetitive pattern. A pattern search would commence at the beginning of the raw data of the intermediate signal applied along line 52 and after the end of each repetitive sequence or non-redundant signal portion except the last. The search algorithm can take many forms. In one example of such a search algorithm, the pattern search starts at a search reference point on each transmitted user signal. Said search algorithm is applied separately to each of said transmitted user signals presented in coded form within the intermediate signal. Starting from said search reference point, such as point 82 on waveform 10 of FIG. 1, a pair of adjacent transmitted user signal portions of predetermined substantially equal duration are identified and a plurality of corresponding points on said signal portions are compared to determine the average difference between the portions defining said pair. This process is repeated for a group of such pairs of signal portions, each pair commencing at the same search reference point 82 but being of different duration than the first pair. However, the signal portions defining each pair of signal portions are of substantially equal duration. The pair of signal portions having the minimum average difference between corresponding data points in the group is thereby identified and the average difference value for this identified pair is in turn compared with a predetermined tolerance value which determines the maximum average difference acceptable as a true repetitive pattern. If the best average difference is above the tolerance, the data is called nonrepetitive, a nominal set of data is accepted as a pattern with only one cycle and the search is resumed at the end of that nominal set. If a true repetitive pattern of two cycles is found, the data beyond the second cycle is compared with the data of the first cycle to see if a third cycle is present, the third cycle would be of substantially the same duration as the first and second cycles. If a third cycle is present, i.e., if the average difference between corresponding data points is less than the maximum average distance accepted as a true repetitive pattern, then the process is continued for a fourth cycle of substantially equal duration to the first. This process may continue until the average difference between the cycle being examined and the initial cycle exceeds the established tolerance, or when a preset maximum number of cycles is reached.

Figure 8:
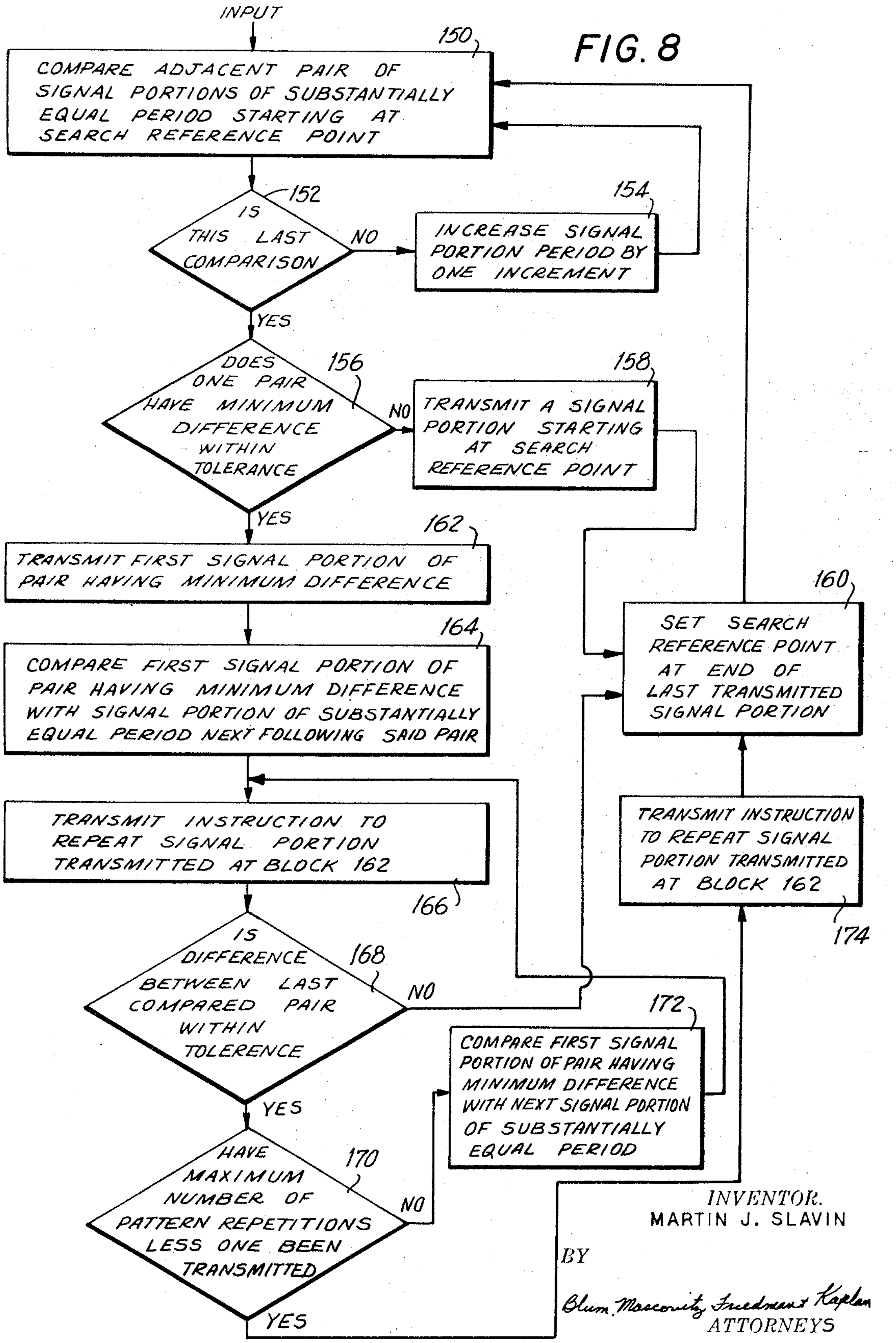
FIG. 8 is a flow chart of one pattern search algorithm according to the invention.

The foregoing search algorithm, as applied to a single channel, is illustrated in the flow chart of FIG. 8. The sets of digital data from a single channel transmitted in the intermediate signal on line 52 would be applied as input to a process block 150 at which the comparison between adjacent pairs of signal portions of substantially equal period is accomplished. Each of the pairs start at a single search reference point for each single cycle of the algorithm. The number of such pairs compared is controlled by the decision block 152. After each comparison except the last comparison, the signal portion period of the pair of signal portions is increased by a single increment as indicated at process block 154. In this manner, a group of pairs of signal portions is subjected to comparison at process block 150, each pair of said group consisting of two adjacent signal portions of substantially equal period but of a period different from the period of the pairs in the group. After the last comparison, a determination is made if one of the compared pairs has a minimum difference within the predetermined tolerance as indicated at decision block 156. If the answer is in the negative, then a signal portion starting at said search reference point is transmitted as indicated by process block 158 and the search reference point is reset to the end of the transmitted signal portion as indicated by process block 160. At this point, the cycle would be repeated starting at the new search reference point.

If one pair of the signal portions does have a minimum difference within the predetermined tolerance, then the first signal portion of said pair is transmitted as indicated by action block 162 and a comparison is performed between said first signal portion of the pair having minimum difference with the signal portion of substantially equal period next following said pair as shown in action block 164.

At this point, as indicated by action block 166, an instruction or directional code would be transmitted directing the repetition of the signal portion transmitted at action block 162, in place of the second signal portion of the pair having minimum difference, which was shown to be redundant at decision block 156. If the difference between the pair of signal portions compared at action block 164 is not within the predetermined tolerance, then the search reference point would be reset at the end of the last transmitted signal portion as indicated by action block 160. In this case, the last transmitted signal portion would be the signal portion replaced by the instruction to repeat the signal portion transmitted at block 162, as indicated at action block 166. If the difference between the compared pair is within the tolerance, as indicated at decision block 168, then a determination is made if the number of pattern repetitions already transmitted equals a predetermined maximum number of pattern repetitions less one which may be transmitted without degradation of the signal. This determination is made at decision block 170, and if this maximum number has not been reached, then the comparison is made between the first signal portion of the pair having minimum difference (signal portion transmitted at action block 162 and stored in buffer memory 76 for this purpose) with the next signal portion of substantially equal period as indicated by action block 172. A closed loop is then formed from action block 172 to action block 166 so that after each such comparison, an instruction is transmitted to repeat the signal portion transmitted at block 162. When the maximum number of pattern repetitions less one have been transmitted, then a last instruction to repeat the signal portion transmitted at block 162 is transmitted, as shown at action block 174, the search reference point is reset to the end of the last transmitted signal portion, and the cycle is repeated starting at this new search reference point. Again, "last transmitted signal" refers to the end of the last signal portion deemed redundant, and in connection with which an instruction to repeat the signal portion transmitted at block 162 is transmitted by action block 166.

All of the foregoing operations are performed on the sets of digital data transmitted in the intermediate signal on line 52. By way of example, reference is had to FIG. 1, wherein the waveform 10 was analyzed by the above-described algorithm. As previously explained, the portions of waveform 10 within brackets 12 and 14 satisfied the requirement that the average difference between corresponding data points as less than the tolerance value which determines the maximum average difference acceptable as a true repetitive pattern, without degradation of the transmitted signal. When a third cycle as defined by bracket 16 was compared with the portion defined by bracket 12, the tolerance value was found to be exceeded. In fact, the next signal portion as defined by bracket 18 was found to be non-redundant after application of the algorithm starting at a search reference point established at point 83. The next search reference point was established at point 84 in waveform 10 and, after application of the algorithm to the next portions of the user signal, the portion of said signal included within bracket 20 was found to be identical within tolerance levels with the next portion (not shown).

The transmission signal applied to line 68 from input processor 66 may consist of a series of digital signals in assigned time slots representative of non-redundant portions of each user signal and directional codes as appropriate. Such signals are substantially compressed so that when the transmission signal is applied through directional couplers and isolation amplifiers 86 to transmission line 40, the bandwidth occupied by said signal is substantially less than the total bandwidth occupied by the four user signals originally received from lines 32, 34, 36 and 38. If desired, the time slots of the transmission signal on line 68 need not be sequentially assigned to the respective user channels, but rather, said channels can be filled in a random manner if the signal within each time slot contains address data for routing said signal to the appropriate user channel at the other end of transmission line 40.

The direction codes transmitted by input processor 66 can be digital codes directing the number of repitions of each non-redundant transmitted user signal. In the alternative, such codes can be address data associated with each non-redundant signal portion identifying the channel on the other end of channel 40 to which such data is to be applied. In the latter embodiment, a second terminal system 30 on the other end of transmission channel 40 would be adapted, as more particularly described below to repeat a non-redundant signal portion addressed to a particular user channel until a second non-redundant signal portion addressed to that particular user portion is received. In such an embodiment, the non-redundant signal portions and associated address data could be randomly assigned to time slots in the signal on line 68 as described above, resulting in a still further compression in the transmission signal on channel 40. The combination of the address data and the time position of said data in the transmission signal on channel 40 constitutes the direction code.

In order for the terminal system according to the invention to be operative, a like terminal must be positioned at the other end of transmission channel 40. This second terminal system would be adapted to reconstruct the transmission signal received from terminal 30 and apply the reconstructed received user signals to respective user channels. Similarly, said other terminal system would be sending transmission signals along channel 40 which would be received at directional couplers and isolation amplifiers 86 and applied along line 88 to output processor 90. The transmission signal received from transmission channel 40 would be of similar format to the transmission signal transmitted by terminal system 30 and would consist, in assigned time slots, of digital data representative of non-redundant portions of user signals from the user channels feeding the other terminal system (not shown) and direction codes providing instruction for the repetition of said non-redundant signal portions. Output processor 90 is coupled along line 92 to control logic 70 for the timing and regulation thereof and along line 94 to buffer memory 76 which provides the storage capability for this repetition process. Output processor 90 need not include a pattern recognition capability, but is merely required to reconstruct the patterns in cyclic form from the incoming data and the coding sequence i.e., from the non-redundant signal portions repeated as directed by the direction codes. Thus if the direction code consists of a single instruction to repeat a non-redundant signal portion, output processor 90 performs this repetition. If the direction code consists of address codes, output processor 90 would be adapted to detect the address code associated with each of the four user channels 32, 34, 36 and 38. The output processor stores each non-redundant portion in buffer memory 76 and repeats the non-redundant signal portion associated with each user channel until another non-redundant signal portion associated with that channel is received. The process is repeated for each received non-redundant signal portion and for each channel. By careful selection of the tolerance values utilized in identifying redundancies in the input processor of the other terminal, this reconstruction produces signals which will, after further processing accurately reconstruct the original analog signals transmitted from the other user channels for application to user channels 32, 34, 36 and 38 as a received user signal.

Figure 4:
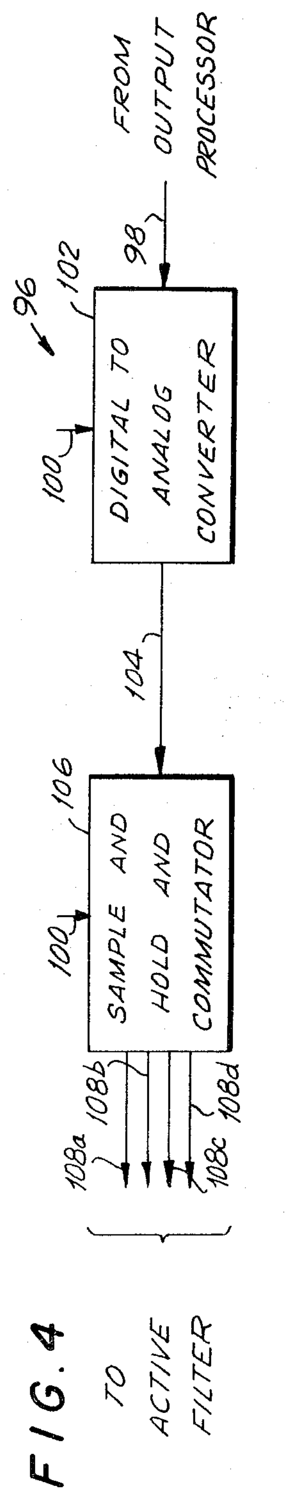
FIGS. 4 and 6 are two embodiments of the decoder of the terminal system according to FIG. 2.

Output processor 90 applies the reconstructed serialized signal to decoder 96 along line 98. The intermediate signal passed from output processor 90 to decoder 96 is similar in format to the intermediate signal passed from encoder 50 along line 52 to input processor 66 in that it preferably consists of a sequential series of digital data samples representative of the analog received user signals to be applied to the user channels. Decoder 96 is coupled to control logic 70 along line 100 for the control thereof. A first embodiment of decoder 96, particularly adapted for use where the original analog transmitted user signals were encoded by the encoder of FIG. 3 is shown in FIG. 4. Thus, the intermediate signal on line 98 is applied to a digital to analog converter 102 for converting each digital signal sample to an analog sample. The series of analog signal samples is then applied along line 104 to sample and hold and commutator 106 which sequentially applies the analog sample signals associated with each received user signal to its respective line 108*a*, *b*, *c* and *d*, which in turn, correspond respectively with user channels 32, 34, 36 and 38. In this manner, the fully reconstructed received user signal corresponding to the user signal originally applied by a corresponding user channel to a terminal system on the other end of transmission channel 40 is produced for application through active filters 110, lines 112*a*, *b*, *c* and *d* and directional couplers and isolation amplifiers 42 to the corresponding user channels 32, 34, 36 and 38.

Figure 6:
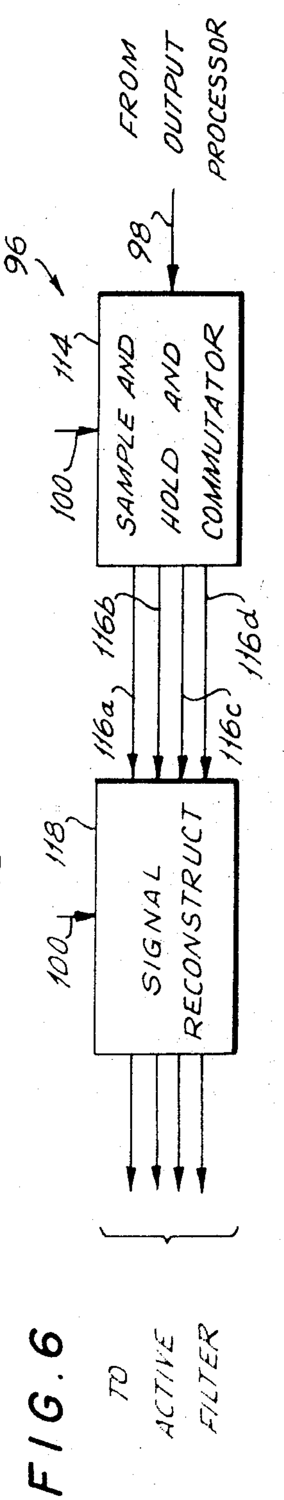

A second embodiment of decoder 96 is shown in FIG. 6 for use where the digital data received along channel 40 consists of series of zero-slope signals such as would be produced by the encoder FIG. 5. In such an embodiment, the series of zero-slope signals repeated as indicated by the direction codes would be applied to a sample and hold a commutator circuit 114 which would sample and apply to four separate lines 116*a*, *b*, *c* and *d*, the codes associated with each user channel. The series of zero-slope signals defining each received user signal would be applied to signal reconstruct circuit 118 which would be adapted to produce an analog received user signal by extrapolating between the data points represented by the zero-slope sample signals in a conventional manner. The four reconstructed user signals would be applied along lines 108*a*, *b*, *c* and *d* to active filters 110, and from there to the respective user channels in the manner described above in connection with FIG. 2.

In order to provide channel identification and activation signals, the terminal system according to the invention includes dial and ringing circuits 120 coupled with user channels 32, 34, 36 and 38 respectively by lines 122*a*, *b*, *c* and *d* for receipt of dialing signals therefrom, and by lines 124*a*, *b*, *c* and *d* for transmission of ringing signals to said user channels, said coupling being through directional couplers and isolation amplifiers 42. The dial and ringing signals are transmitted in digital form. The dial signals are transmitted from dial and ringing circuits 120 along line 126 through control logic 70 to input processor 66 which is adapted to insert said dial signals in the transmission signal applied to line 68 and eventually to transmission channel 40. In like manner, ringing signals in digital form are received from said transmission channel, applied along line 88, through output processor 90, control logic 92 and line 128 to dial and ringing circuits 120.

If desired, a one way terminal system may be provided by having a separate transmission terminal incorporating encoder 50 and input processor 66 and associated elements and a separate receiver terminal incorporating output processor 90 and decoder 96 and associated elements, said transmission and receiver terminals being coupled by transmission line 40. While the arrangement according to the invention provides for the encoding accomplished by encoder 50 to include the multiplexing of the four signals onto a single line, such multiplexing can be accomplished after processing by an input processor, in which case four separate input processors 66 or a single input processor capable of four simultaneous operations would be required and the output of said input processor would be applied to a sample and hold and commutate circuit. In like manner, the signal received from transmission channel 40 along line 88 could be subjected to a sample and hold and commutate operation in which case four output processors or an output processor capable of handling four separate inputs would be required and the decoder would not incorporate such sample and hold and commutator circuitry.

Figure 7:
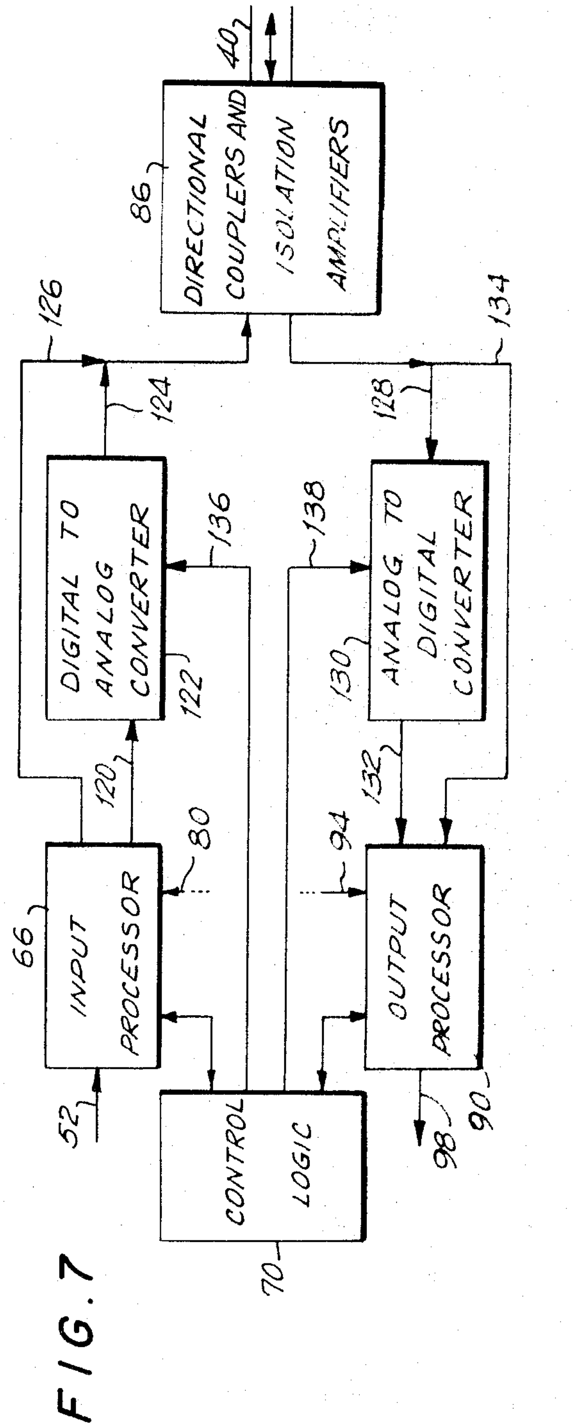
FIG. 7 is a partial diagram of another embodiment of the terminal system according to the invention.

In still a further embodiment of the terminal system according to the invention, shown in part in FIG. 7, the series of digital sample signals or zero-slope signals representing a non-redundant portion of the transmitted user signal from input processor 66 is supplied along line 120 to digital to analog converter 122 which reconverts the non-redundant portions of the transmitted user signals into analog form for application along line 124, through directional couplers and isolation amplifiers 86 to transmission channel 40. The direction codes, including address codes, are transmitted by input processor 66 along line 126 for insertion in the appropriate time slots in the signal on line 124 for application to transmission channel 40. Thus, in this embodiment, the signal passing in both directions on transmission channel 40 consists of analog non-redundant signal portions and digital direction codes and dial and ringing signals. Such signals, transmitted from another terminal system of like construction on the other end of transmission channel 40, are received by directional couplers and isolation amplifiers 86 for application along line 128. The signals are applied to analog to digital converter 130 which converts the analog non-redundant signal portion to digital form for application along line 132 to output processor 90. The signal on line 128 is passed directly to said output processor along line 134 to permit receipt of the digital codes thereby. Output processor 90 operates in the manner described above to reconstruct the received user signals. Digital to analog converter 122 and analog to digital converter 130 are coupled to control logic 70 along lines 136 and 138 respectively for control thereby. The embodiment of FIG. 7 results in still further compression since the bandwidth occupied by a non-redundant signal portion in analog form may be substantially less than the bandwidth occupied by the same signal portion in digital form.

The above described system is particularly adapted for use in telephone systems wherein said transmission and user channels are telephone lines. However, other means of transmission may be utilized in connection with this invention and although four user channels are shown in the drawings, this showing is by way of example and not by way of limitation, the maximum number of channels depending on the characteristics of the transmission line 40 and of the signals being transmitted therealong. While the foregoing system is particularly adapted for the transmission of voice signals due to the repetitive qualities thereof, said system could also be utilized for the transmission of any analog or digital signal having similar repetitive characters.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A terminal system for interconnecting a plurality of user channels and a transmission channel of limited bandwidth for transmission of telephone voice signals and the like comprising, input processor means connected to said user channels for receiving the analog transmitted user signal on each of said user channels, and for detecting redundancies in the pattern of each of said transmitted user signals, and for applying a transmission signal to said transmission channel including at least a non-redundant portion of each redundant pattern of each of said transmitted user signals and a direction code adapted to communicate the number of repetitions of each such non-redundant portion necessary to produce said redundant patterns, said input processor means including pattern search means for comparing with each other the patterns of each pair of analog signal portions of a group of pairs of adjacent analog signal portions of each transmitted user signal, the signal portions in each pair being of substantially equal duration, each of said pairs of said group starting at a single reference point in said transmitted user signal, said pattern search means being adapted to identify a pair of said group as a redundant pattern in a transmitted user signal; and output processor means for receipt from said transmission channel of a transmission signal including non-redundant received user signal portions and direction codes associated with each of said user channels, said output processor means being adapted to reconstruct the received user signal associated with each user channel by incorporating the associated non-redundant received user portion repeated as directed by the associated direction codes, and to apply each of said received user signals to the user channel associated therewith.

2. A terminal system as recited in claim 1, wherein said pattern search means is adapted to compare one of said pair of adjacent portions defining a redundant pattern of a transmitted user signal with the next adjacent portion of said transmitted user signal, said next adjacent portion of said transmitted user signal being substantially equal in duration with the portions defining said redundant pattern pair, said pattern search means being further adapted to determine if said redundant pattern pair and said next adjacent portion constitute a redundant pattern of said transmitted user signal.

3. A terminal system as recited in claim 1, wherein said pattern search means is adapted to identify a pair of said group as a redundant pattern by comparing a plurality of corresponding predetermined points on each of said pair of transmitted user portions, and determining if said points correspond within a predetermined tolerance.

4. A terminal system as recited in claim 1, including encoder means connected intermediate said user channels and said input processor means for detecting points on the analog transmitted user signal on each of said user channels at which the slope of the curve defining said analog transmitted user signals substantially equals zero and producing a zero-slope sample signal associated with at least some of said points, said zero-slope sample signal including a portion representative of the magnitude of said signal at said point and a portion representative of the time position of said point, said input processor means being adapted to detect redundancies in the pattern of said zero-slope sample signals associated with each user channel, said output processor means being adapted to reconstruct the received user signal associated with each user channel as a series of zero-slope signals; and decoder means connected intermediate said output processor means and said user channels for producing the analog received signal representative of the series of zero-slope signals associated with each user channel and applying the respective analog received user signals thus produced to the user channels associated therewith.

5. A terminal system as recited in claim 1, including encoder means connected intermediate said user channels and said input processor means for sequentially sampling the analog transmitted signal on each of said user channels to produce a series of analog sample signals and for producing a digital sample signal representative of each of said analog sample signals, said input processor means being adapted to detect redundancies in the pattern of digital sample signals associated with each user channel, said output processor means being adapted to reconstruct the received user signal associated with each user channel as a sequential series of digital sample signals; and decoder means connected intermediate said output processor means and said user channels for producing an analog sample signal representative of each of the digital sample signals received from the output processor means and sequentially applying the respective analog sample signals thus produced to the user channel associated therewith.

6. A terminal system as recited in claim 5, including digital to analog converter means intermediate said input processor means and said transmission channel for converting the digital sample signals of each non-redundant transmitted user signal to analog form for incorporating in the transmission signal; and analog to digital converter means intermediate said transmission channel and said output processor means for converting each analog non-redundant received user signal portions from said transmission line to a series of digital samples for application to said output processor means.

7. A terminal system as recited in claim 1, wherein the transmission signal produced by said input processor means is divided into a plurality of time slots sequentially assigned to each of said user channels for the transmission therein of the associated non-redundant portions of each redundant pattern and direction codes.

8. A terminal system as recited in claim 1, wherein said input processor means is adapted to produce a transmission signal divided into a plurality of time slots, and including address data associated with each non-redundant transmitted user signal portion for identifying the destination of said signal portion, said non-redundant transmitted user signal portions and associated address data being randomly assigned to said transmission signal time slots; said output processor means being adapted to receive a transmission signal including non-redundant received user signal portions and associated address data identifying the user channel to which the latter signal portions are directed in randomly assigned time slots, said output processor means further being adapted to repeat each non-redundant received user signal portion associated with one of said user channel until the next such signal portion associated with that user channel is received.

9. A terminal system as recited in claim 1, wherein said input and output processor means include buffer memory means for storage of user signal portions during operations thereon.

10. A terminal system according to claim 1, including dial and ringing circuit means connected to said plurality of user channels for applying ringing signals thereto and receiving dial signals therefrom, said input processor means being connected to said dial and ringing circuit means for detecting said dial signal and applying same to said transmission channel, said output processor means being connected to said dial and ringing circuit means for applying thereto ringing signals received from said transmission channel.

11. A terminal system according to claim 1, wherein said user and transmission channels are telephone lines.

12. In a terminal system for interconnecting a plurality of user channels and a transmission channel of limited bandwidth for transmission of telephone voice signals and the like, a transmission device comprising input processor means connected to said user channels for receiving the analog transmitted user signals on each of said user channels, and for detecting redundancies in the pattern of each said transmitted user signal, and for applying a transmission signal to said transmission channel including at least a non-redundant portion of each redundant pattern of each of said transmitted user signals and a direction code adapted to communicate the number of repetitions of each such non-redundant portions necessary to reproduce said redundant patterns, said input processor means including pattern search means for comparing with each other the patterns of each pair of analog signal portions of a group of pairs of adjacent analog signal portions of each transmitted user signal, the signal portions in each pair being of substantially equal duration, each of said pairs in said group starting at a single reference point in said transmitted user signal, said pattern search means being adapted to identify a pair of said group as a redundant pattern in a transmitted user signal.

13. A terminal system as recited in claim 12, wherein said pattern search means is adapted to identify a pair of said groups as a redundant pattern by comparing a plurality of corresponding predetermined points on each of said pair of transmitted user signal portions, and determining if said points correspond within a predetermined tolerance.

14. A terminal system as recited in claim 12, including encoder means connected intermediate said user channels and said input processor means for detecting points on the analog transmitted user signal on each of said user channels at which the slope of the curve defining said analog transmitted user signals substantially equals zero and producing a zero-slope sample signal associated with at least some of said points, said zero-slope sample signal including a portion representative of the magnitude of said signal at said point and a portion representative of the time position of said point, said input processor means being adapted to detect redundancies in the pattern of said zero-slope sample signals associated with each user channel.

15. In a terminal system for interconnecting a plurality of user channels and a transmission channel of limited bandwidth for transmission of telephone voice signals and the like, a receiver device comprising output processor means for receipt from said transmission channel of a transmission signal including noncredundant received user signal portions and direction codes associated with each of said user channels, said received user signal portions being analog pattern segments of a sound signal, said output processor means including means for reconstructing the received user signal associated with each user channel by digitizing the associated non-redundant received user signal portion, means for repeating the digitized non-redundant received user signal portions as directed by the associated direction codes to produce an intermediate digital signal and means for converting the intermediate digital signal to an analog user signal for application to the user channel associated therewith.

16. A terminal system as recited in claim 15, wherein said output processor means is adapted to reconstruct the received user signal associated with each user channel as a series of zero-slope signals, each zero-slope signal including a portion representative of the magnitude of an analog signal at a point at which the slope of the curve defining said analog signal substantially equals zero and a portion representative of the time position of said point in said signal, said terminal system including decoder means connected intermediate said output processor means and said user channels for producing the analog received user signal representative of the series of zero-slope signals associated with each user channel and applying the respective analog received user signals thus produced to the user channels associated therewith.

17. A terminal system as recited in claim 15, wherein said output processor means is adapted to reconstruct the received user signal as associated with each user channel as a sequential series of digital sample signals, each digital sample signal being disposed in a time slot assigned to the associated user channel, said terminal system including decoder means connected intermediate said output processor means and said user channels for producing an analog sample signal representative of each of the digital sample signals received from the output processor means and sequentially applying the respective analog sample signals thus produced to the user channel associated therewith.

* * * * *